United States Patent [19]

Liboff et al.

[11] Patent Number: 5,077,934
[45] Date of Patent: Jan. 7, 1992

[54] METHOD AND APPARATUS FOR CONTROLLING PLANT GROWTH

[75] Inventors: Abraham R. Liboff, Birmingham, Mich.; Bruce R. McLeod, Bozeman, Mont.; Stephen D. Smith, Lexington, Ky.

[73] Assignee: Life Resonances, Inc., Bozeman, Mont.

[21] Appl. No.: 411,545

[22] Filed: Sep. 22, 1989

[51] Int. Cl.⁵ .............................................. A01G 7/04
[52] U.S. Cl. .................................................... 47/1.3
[58] Field of Search ............................ 47/1.3; 435/173

[56] References Cited

U.S. PATENT DOCUMENTS

| | | | |
|---|---|---|---|
| 3,566,877 | 3/1971 | Smith et al. | 128/422 |
| 3,890,953 | 6/1975 | Kraus et al. | 128/1.5 |
| 3,893,462 | 7/1975 | Manning | 128/421 |
| 3,911,930 | 10/1975 | Hagfors et al. | 128/421 |
| 3,952,751 | 4/1976 | Yarger | 128/422 |
| 4,105,017 | 8/1978 | Ryaby et al. | 128/1.5 |
| 4,266,532 | 5/1981 | Ryaby et al. | 128/1.5 |
| 4,428,366 | 1/1984 | Findl et al. | 128/1.5 |
| 4,459,988 | 7/1984 | Dugot | 128/420 |
| 4,535,775 | 8/1986 | Brighton et al. | 128/419 |
| 4,548,208 | 10/1986 | Niemi | 128/419 |
| 4,600,010 | 7/1986 | Dugot | 128/419 |
| 4,616,629 | 10/1986 | Moore | 128/1.5 |
| 4,654,574 | 3/1987 | Thaler | 320/14 |
| 4,683,873 | 8/1987 | Cadossi et al. | 128/1.5 |
| 4,757,804 | 7/1988 | Griffith et al. | 128/1.5 |

FOREIGN PATENT DOCUMENTS

| | | | |
|---|---|---|---|
| 38255/85 | 1/1985 | Australia | 128/1.3 |
| 1164951 | 3/1984 | Canada | 47/1.5 |
| 0648165 | 2/1979 | U.S.S.R. | 47/1.3 |
| 2145317 | 3/1985 | United Kingdom | 47/1.3 |

OTHER PUBLICATIONS

"Stimulation of Fracture Healing With Electromagnetic Fields of Extremely Low Frequency", (EMF of ELF), Clinical Orthopedis & Related Research, No. 186, 6/84.
"Interactions Between Electromagnetic Fields and Cells", Chiabrera et al., Plenum Publishing (1985), pp. 281-291.
"A Role For the Magnetic Field in the Radiation-Induced Efflux of Calcium Ions From Brain Tissue in Vitro", Bioelectromagnetics 6:327-337 (1985).
"Bioelectrochemical Studies of Implantable Bone Stimulation Electrodes", Bioelectrochemistry and Bioenergetics 5,222-238 (1978).
"Inducing Bone Growth in Vivo by Pulse Stimulation", Clinical Orthopedics and Related Research, No. 88, 10/72.
"Clinical Experience with Low-Intensity Direct Current Stimulation of Bone Growth", Clinical Orthopedics and Related Research, No. 124, 5/77.
"Geomagnetic Cyclotron Resonance in Livinig Cells," Journal of Biological Physics, vol. 13, 1985.

*Primary Examiner*—James R. Feyrer
*Attorney, Agent, or Firm*—Dykema Gossett

[57] ABSTRACT

A method and apparatus for controlling plant growth is provided. The apparatus includes a magnetic field generator for producing a controlled, fluctuating, directionally oriented magnetic field parallel to a predetermined axis projecting through viable plant material. In one aspect, a magnetic field detector measures the magnetic flux density along the predetermined axis. The applied magnetic field may comprise a full-wave rectified signal oscillated at predetermined frequencies to maintain a preselected ratio of frequency to the non-zero average value of the flux density, where the ratio is effective in altering the natural growth characteristics of the target plant material, such as accelerating growth rate. This ratio is maintained by adjusting the frequency of the fluctuating magnetic field and/or by adjusting the intensity of the applied magnetic field after nulling out or measuring and accounting for the local magnetic field in that region containing the target plant material.

23 Claims, 3 Drawing Sheets

5,077,934

METHOD AND APPARATUS FOR CONTROLLING PLANT GROWTH

FIELD OF THE INVENTION

The present invention relates generally to methods and apparatus for controlling plant growth. More specifically, the present invention relates to methods and apparatus for controlling plant growth through the use of oscillating magnetic fields.

BACKGROUND OF THE INVENTION

Botanists have long studied the effects of various stimuli on plant growth. The phenomena of phototropism, geotropism and chemotropism by which external stimuli of light, gravity and chemicals bring about directionally oriented plant growth are well characterized. It is known that phytohormones mediate cellular differentiation and that a specific complement of nutrients must be available to support plant growth. Advances in the understanding of plant physiology have contributed greatly to the development of agricultural techniques which optimize crop production as well as facilitate the efficient operation of plant nurseries.

The control of plant growth and development through the application of plant hormones is widely used to promote root growth in the asexual reproduction of plants. This procedure is instrumental in establishing fruit orchards where unique plant varieties are propagated by means of cuttings and through the grafting of scions on root stalks. In essence, an auxin such as indoleacetic acid is applied to the cut end of a plant to stimulate root formation. Plant hormones are also utilized to retard the formation of abscission layers in an effort to prevent early drop of fruit. It will be appreciated by those skilled in the art that early drop causes an unripened fruit crop. Synthetic auxins such as alpha naphthalene acetic acid have been applied successfully to control fruit set and also to regulate flowering time.

More recently, the use of tissue cultures to regenerate plants from cell suspensions or protoplasts, particularly for the propagation of virus-free plants, has received wide spread attention. In experiments by Shillito and others and by Prioli and others, plant regeneration of maize protoplasts was investigated as a possible solution to the problem of time-intensive back-crossing.

In plant tissue and organ culture, a plant organ or cell aggregate is removed from a plant and placed in a nutrient solution. The plant cells continue to grow and divide, forming a callus which then forms shoots and roots. The plantlets or embryoids are placed in media which promotes leaf expansion and internode elongation. The plantlets can then be grown to maturity in soil. This technique is particularly desirable as an adjunct to gene transfer and somatic hybridization procedures.

These efforts, in addition to selective breeding and fertilizer use, underscore the long felt need to increase the rate at which plant growth occurs. As will be described hereinafter, the present invention provides a method and apparatus by which plant growth can be regulated.

In recent years, multi-disciplinary investigations have provided evidence suggesting that electric and magnetic fields play an important role in cell and tissue behavior. In U.S. Pat. No. 4,818,697, entitled "Techniques For Enhancing The Permeability Of Ions Through Membranes," and its continuation application, Ser. No. 280,848, filed on Dec. 7, 1988, which have been assigned to the assignee of the present invention and the disclosures of which are incorporated herein by reference, a method and apparatus are disclosed by which transmembrane movement of a preselected ion is magnetically regulated using a time-varying magnetic field. The fluctuating magnetic field is preferably tuned to the cyclotron resonance energy absorption frequency of the preselected ion. This important discovery brought to light the interplay of local magnetic fields and frequency dependence in ion transport mechanisms. It has now been discovered that by utilizing and extending the principles of cyclotron resonance tuning, unexpected and remarkable advances in the control and modification of growth processes of plants can be achieved.

The U.S. Patent Application Ser. No. 236,044, filed on Aug. 24, 1988, entitled, "Method And Apparatus For Controlling The Rate Of Eukaryotic Fermentation," which has been assigned to the assignee of the present invention and the disclosure of which is incorporated herein by reference, the discovery that cyclotron resonance regulation can be utilized to control the rate of fermentation of a substrate by eukaryotes is disclosed. In a number of copending patent applications which are assigned to the assignee of the present invention, more specifically, U.S. Patent Application Ser. Nos. 172,268 (filed Mar. 23, 1988); 254,438 (filed Oct. 6, 1988); 295,164 (filed Jan. 9, 1989); the disclosures of which are incorporated herein by reference, it is disclosed that cyclotron resonance regulation is effective in controlling the development of living human tissue.

In U.S. Patent Application Ser. No. 109,783, filed Oct. 16, 1987, entitled "A System for Controlling Cell Behavior Using an Applied Oscillating Magnetic Field," which is assigned to the assignee of the present invention and the disclosure of which is incorporated herein by reference, the present inventors disclose the use of cyclotron resonance for controlling cell motility.

In U.S. Patent Application Ser. No. 343,017, filed Apr. 25, 1989 entitled "Methods And Apparatus For Regulating Transmembrane Ion Movement Utilizing Selective Harmonic Frequencies And Simultaneous Multiple Ion Regulation," the disclosure of which is incorporated herein by reference, the present inventors disclose a method of utilizing higher-harmonic frequencies for ion transport and a method of simultaneously controlling multiple ions.

It is an object of the present invention to provide a method and apparatus by which the rate of plant growth can be increased, or alternatively decreased.

It is a further object of the present invention to provide such a method and apparatus for controlling plant growth rates which allows for the selective control of differential growth processes such as flower and fruit maturation.

SUMMARY OF THE INVENTION

In one aspect, the present invention provides an apparatus for controlling plant growth, such as Romano Bush Beans. The novel apparatus includes magnetic field generating means such as a field coil or solenoid for generating a controlled, fluctuating magnetic field in a predetermined space in which a plant or plant tissue culture is placed. In operation, a fluctuating, directionally oriented magnetic field is generated by the magnetic field generating means. The applied magnetic flux is directed along a predetermined axis which penetrates the predetermined space, passing through the plant material. In one embodiment, the applied magnetic flux along the axis is superimposed on that component of the local or ambient magnetic field which is parallel to the predetermined axis to create a fluctuating composite field. The resultant combined magnetic flux which is parallel to the predetermined axis passes through the plant material. A magnetic field sensor is employed to determine the average value of the magnetic flux density which passes through the predetermined space along the predetermined axis. In another embodiment, a second pair of coils is also provided to adjust or reduce the component of the local magnetic field along the predetermined axis to zero or to a preselected value.

In one embodiment, the frequency of the fluctuating magnetic field is set at a predetermined value and the average value of the magnetic flux density is then regulated by adjusting the magnitude of this average value to produce a magnetic field having a preselected ratio of frequency-to-field strength which controls the growth of the target plant material. In a preferred embodiment, changes in the strength of the local magnetic field along the predetermined axis which would otherwise alter the average value of the magnetic flux density of the combined magnetic field parallel to the predetermined axis and which would thus produce deviations from the desired ratio are counterbalanced by adjusting the D.C. offset value of the average applied magnetic field. In another embodiment, these changes in the local field intensity are counterbalanced using the second coil pair. These adjustments are preferably made by microprocessing means in association with both the magnetic field generating means and the magnetic field sensor.

In one embodiment, the means for applying a magnetic flux includes two opposed field coils arranged in Helmholtz configuration such that an applied magnetic field having known parameters along the predetermined axis can be generated between the coils. In another embodiment, a second pair of field coils are placed such that they generate an applied magnetic flux along an axis perpendicular to the predetermined axis defined by the first coil pair. In this same manner, a third pair of opposed coils can be utilized such that magnetic fields are applied by the three coil pairs along the x, y, and z axes of a Cartesian coordinate system. The second and third coil pairs are similarly actuated to provide a predetermined relationship between the frequency of the magnetic flux and the intensity of the magnetic flux density. The predetermined relationship between the frequency of the magnetic flux permeating the plant material and the intensity of the magnetic flux is determined by the cyclotron resonance equation $f_c/B = q/(2\pi m)$, where $f_c$ is the frequency in Hertz, B is the average value of the magnetic flux density in Tesla parallel to the predetermined axis, q/m has a value of from about $5 \times 10^5$ to about $100 \times 10^6$ Coulombs per kilogram and where B typically has a value of less than about $1 \times 10^{-2}$ Tesla. q/m is the charge-to-mass ratio of a preselected ion present in the plant material.

Controlling plant growth through the use of higher-harmonic tuning and multiple ion tuning is also provided.

DESCRIPTION OF THE PREFERRED EMBODIMENTS OF THE INVENTION

Figure 1:
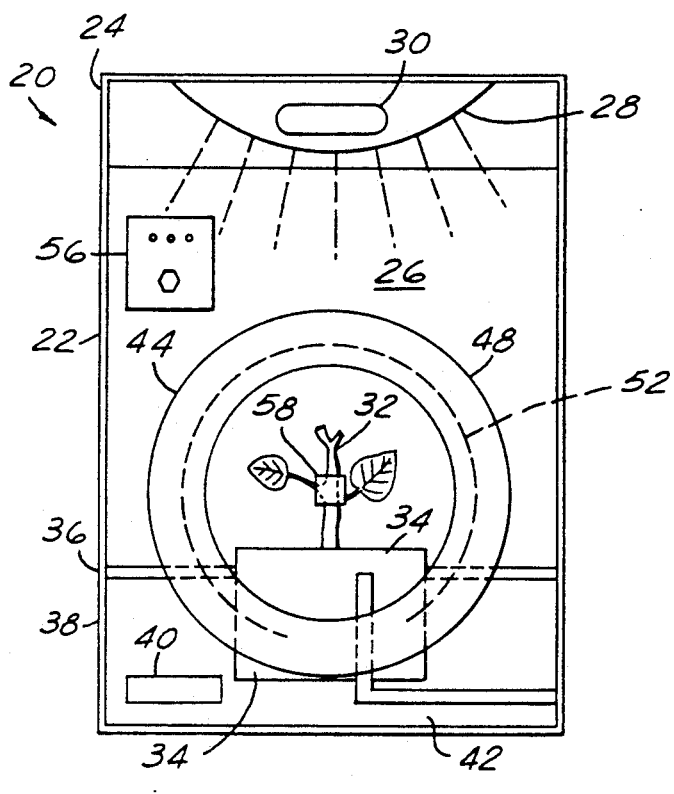
FIG. 1 is a front elevational view of the plant growth apparatus of the present invention shown diagrammatically.

Referring now to FIG. 1 of the drawings, plant growth apparatus 20 is shown comprising housing 22 which includes cap or lid 24 which permits easy access to chamber 26. Mounted within cap 24, light dome 28 is seen in which grow light 30 is mounted. Chamber 26 contains viable plant or plant material 32 within a controlled environment. The precise temperature, humidity level, and degree of illumination and the like in this controlled environment are selected in accordance with known principles of plant growth, the characteristics of the selected species and/or nature of the plant material, and the growth characteristics of which are to be controlled in accordance with the present invention. Accordingly, in this embodiment, plant 32 is shown as a seedling projecting from soil within soil receptacle 34. Soil receptacle 34 is closely received within an opening provided in base plate or floor 36 which serves as a partition defining area or space 38 in which power supply 40 and liquid supply line 42 are concealed. Liquid supply line 42 is simply a tube or the like which attaches to a port provided on soil receptacle 34 such that water and suspended nutrients can be flowed into soil receptacle 34 to provide adequate water and nutrition for plant 32. The various parts of plant growth apparatus 20 should be constructed of materials which do not interfere with the magnetic fields which are generated.

Figure 2:
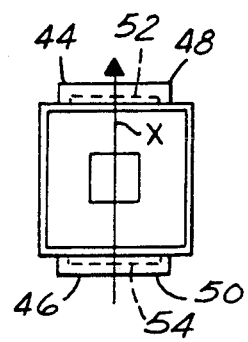
FIG. 2 is a top view of the plant growth apparatus of the present invention.

Referring now to FIGS. 1 and 2 of the drawings, mounted externally on housing 22 there is shown at least one pair of field coils 44 and 46, only one of which (44) can be seen in FIG. 1. Each field coil 44, 46 serves as means for generating an applied magnetic field and comprises an annular housing 48 and 50, in which wire coils 52 and 54 are contained. For the purpose of providing a clear explanation of the present invention, in FIGS. 1 and 2 of the drawings, plant growth apparatus 20 is shown somewhat diagrammatically with the walls of housing 22 being made of a translucent plastic material. Coil housings 48 and 50 are shown as opaque with the wire of each coil being shown in phantom. As will be explained more fully, coils 44 and 46 are driven by power source 40 and associated electronics provided at control panel 56.

In order to sense or measure the magnetic field within chamber 26 in that region which is occupied by plant 32, a magnetic field sensing device, shown in FIG. 1 as a Hall-effect device 58 is provided. In this particular embodiment, magnetic sensor 58 is mounted on the outside surface of housing 22 in the center of coil 44.

Figure 3:
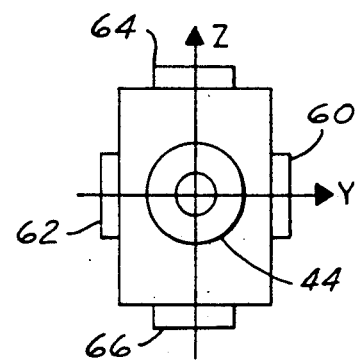
FIG. 3 is a side elevational view of another embodiment of the present invention which is also shown diagrammatically.

Referring now specifically to FIG. 3 of the drawings, a second pair of coils 60-62 and a third set of coils 64-66 may be provided for a system in which a magnetic field is generated along the x, y and z axes of a Cartesian coordinate system. The function of these additional coil pairs will be explained more fully hereinafter.

With respect to coils 44 and 46 the number of turns of wire 52, 54, the diameter of the coils, the distance separating the coils and the wire gauge are not critical except insofar as conventional practice requires constraints on these and other design parameters to allow optimal performance characteristics in achieving uniform flux densities as required in the preferred practice of the present invention. In one preferred embodiment each coil 44, 46 has up to about 3,000 turns or loops of conducting wire 52, 54. Other magnetic field generating means may also be suitable for use in the present invention and are contemplated as falling within the scope of the invention. Also, it may be suitable in some applications to place coils 44 and 46 inside chamber 26. In the preferred embodiment, the geometry and relative position of coils 44 and 46 are such that the coils operate as a Helmholtz pair. Thus, those skilled in the art will appreciate that coils 44 and 46 are substantially identical, field-aiding parallel coaxial field coils separated by a distance equal to the radius of each coil. In this preferred embodiment, the Helmholtz configuration produces an applied magnetic field, which occupies that portion of chamber 26 in which plant 32 is positioned and through which the applied magnetic field will pass.

As best shown in FIG. 2 of the drawings, coils 44 and 46 produce or generate an applied magnetic field, along predetermined axis X. The direction of the magnetic field along predetermined axis X is determined by the direction of the current through coils 44 and 46. Similarly, and referring now to FIG. 3 of the drawings, in that embodiment in which coils 60, 62 and 64, 66 are provided in accordance with the present invention, magnetic fields are generated along axes Y and Z respectively.

As will be appreciated, in most environments plant 32 will be subject to a local magnetic field which is generally defined herein as the magnetic influences, including both local magnetic sources as well as the geomagnetic field. In describing the operation of the present invention, the term "magnetic flux density" shall be defined in the customary manner as the number of magnetic field lines per unit area of a section perpendicular to the direction of flux. In one embodiment of the present invention, coils 44 and 46 are used to create an applied, fluctuating magnetic field which, when combined with the local magnetic field parallel to axis X, produces a resultant combined or composite magnetic field having a precisely controlled, predetermined ratio of magnetic flux density to frequency.

Hence, in operation and referring now to FIGS. 1 and 2 of the drawings, plant 32 is placed in position in chamber 26 of plant growth apparatus 20. Plant 32 is supplied with the necessary nutrients for growth as well as water, light, etc., as would be required for usual growth of the target plant or plant material. It is to be understood that the present invention may also be useful in stimulating the growth of plantlest from cell aggregates or protoplasts and such use is specifically contemplated as falling within the present invention. Moreover, the present invention is particularly adapted for changing the rate at which seeds germinate. Water and nutrients may be supplied through nutrient supply line 42, although numerous other arrangements would also be suitable.

In one preferred embodiment, plant 32 comprises seeds such as Romano Bush Beans. Coils 44 and 46 are energized via power supply 40 which is regulated by control panel 56. Oscillating means such as a conventional ac sine wave generator and the appropriate switches (not shown) is utilized such that the magnetic field generated by coils 44 and 46 along axis X fluctuates or oscillates at a predetermined rate. In this particular embodiment of the invention, there is also present a local magnetic field component along axis X which will either augment or oppose the applied magnetic field. For the purposes of the present invention, the average value, or net average value where a local component is present, of the magnetic field component parallel to axis X is determined, preferably using magnetic sensor 58. The magnetic field along axis X which passes through plant 32 is then regulated in accordance with the following equation: $f_c/B = q (2\pi m)$ where $f_c$ is the frequency of the combined magnetic field in Hertz, B is the average value of the magnetic flux density of the combined magnetic field parallel to predetermined axis X in Tesla, and q/m has a value of from about $5 \times 10^5$ to about $100 \times 10^6$ Coulombs per kilogram. B preferably has a value not in excess of $1 \times 10^{-2}$ Tesla. To increase the rate of plant growth or germination, as an example, the following frequency and associated combined magnetic flux density (B) is preferred:

| fc (Hertz) | B (Tesla) |
|---|---|
| 16.0 | $2.09 \times 10^{-5}$ | at an ac amplitude, peak-to-peak, of 40 microTesla.

Those skilled in the art will recognize this equation as the cyclotron resonance equation. In the present invention plant growth is controlled by maintaining a preselected ratio between the magnetic flux density along the predetermined axis which permeates the plant material and the rate of fluctuation or oscillation of the applied field determined with reference to a preselected ionic species. For example, in the aforementioned preferred ratio, the preselected ionic species to which the plant growth controlling field is tuned is Calcium ($Ca^{++}$). The growth rate is also increased by tuning to Magnesium ($Mg^{++}$). Tuning to Potassium ($K^+$) is effective in inhibiting above ground plant mass and stem diameter while root mass is increased.

The relatively low applied flux density and the precise, predetermined relationships of combined flux density and frequency provided by the present invention should be maintained, notwithstanding changes in the local magnetic field. This may be achieved in essentially two preferred manners which will be explained more fully herein. Thus, magnetic field sensor 58 is provided to determine the level of the magnetic flux density of the local magnetic field along the predetermined axis.

Figure 4:
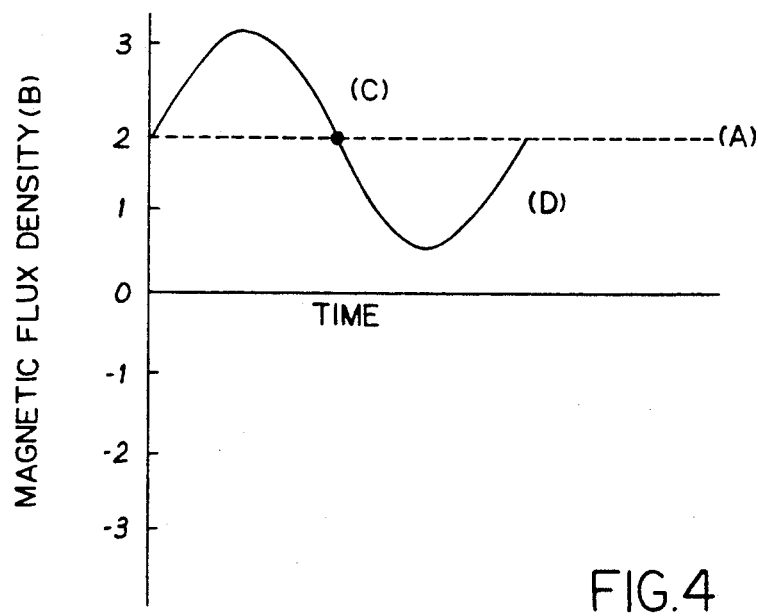
FIG. 4 is a chart which illustrates the non-zero average value of the present invention.

It will be appreciated that the unexpected and superior results of the present invention are achieved by creating a fluctuating magnetic field having a magnetic flux density parallel to some predetermined axis X, with the magnetic flux density along the axis being maintained at a predetermined ratio to the frequency of the fluctuations. Significantly, the magnetic flux density parallel to predetermined axis X is maintained at a nonzero average value. More specifically, as illustrated in FIG. 4 of the drawings, the effective magnetic field of the present invention can be thought of as a static field having reference level A on which a fluctuating magnetic field (D) is superimposed. It comprises an ac component which varies in amplitude but not direction and a dc reference around which the ac component varies. Reference level A is the non-zero average value of the flux density (B). Therefore, it will be understood that the non-zero average, or net average value where the magnetic field is the combination of the local field and the applied field, along predetermined axis X is utilized since the magnitude B of the composite flux density changes at a predetermined rate due to oscillation or fluctuation of the applied magnetic flux. Thus, an average value is utilized which is a non-zero average value illustrated at point (c). This reflects that although the magnetic flux density along the axis is oscillating at a controlled rate, the field is regulated to ensure that the field is always unipolar; that is, the field is always oriented parallel to predetermined axis X and is either above or below the O flux density line.

Plant 32 is subjected to a fluctuating magnetic field as described herein for a period of time effective to bring about the desired change in growth characteristics. While the length of time necessary may vary, it is anticipated that about one week of exposure will provide some beneficial results. Longer exposure will be desirable in most applications.

As stated, values for q and m are determined with reference to a preselected ionic species. It will be known by those skilled in the art that the biochemical milieu of plant material comprises a mixture of various ions in the intracellular and extracellular fluids. These ions include potassium ions, magnesium ions, sodium ions, chloride ions, phosphate ions, sulfate ions, carbonate ions, bicarbonate ions and the like and various ions formed by the dissociation of amino acids, proteins, sugars, nucleotides and enzymes. By utilizing the values of charge and mass for a preselected ion in the equation set forth above, which, as previously stated, is the cyclotron resonance relationship solved for $f_c/B$, ratios of frequency to magnetic flux density can be determined which control plant growth in accordance with the present invention. The beneficial results of the present invention are achieved when the preselected ions absorbs energy from the magnetic field of the present invention.

It will also now be appreciated by the prior explanation of preferred embodiments of the present invention and from the equation for establishing a cyclotron resonance relationship, that either the frequency of the fluctuating magnetic field or the magnitude or intensity of the magnetic flux density along the predetermined axis, or both the frequency and the intensity of the flux density, can be adjusted to provide a magnetic field which has the desired characteristics. However, it is preferred to maintain a constant frequency which thus requires that the intensity of the applied magnetic flux density be adjusted to compensate for changes in the local magnetic field in order to maintain a constant ratio of frequency to magnetic flux density. For example, if it is necessary to maintain a frequency of 16 Hz and an average flux density of $1.26 \times 10^{-5}$ Telsa, changes in the local field which would otherwise cause unwanted deviations in the combined magnetic flux density must be corrected by increasing or decreasing the applied magnetic flux density accordingly. This is most preferably performed by the microcontroller in connection with both the field generating means and the field-sensing device. Alternatively, if changes in the combined magnetic flux density occur due to changes in the local magnetic field, the frequency of the oscillations can then be changed so that the preferred ratio is maintained. Once again, it is important to realize that the value of B is the average composite magnetic flux density parallel to the predetermined axis since the magnitude of the flux density changes as the field is oscillated. It will be understood that detection of changes in the magnetic field due to changes in the ambient component should be at intervals frequent enough to provide a frequency-to-magnetic field ratio which is substantially constant, notwithstanding the changes in the local field component.

It is also to be understood that the applied magnetic field which results in a combined magnetic flux density along predetermined axis X may be produced by a sinusoidal signal or from a full-wave rectified signal applied to coils 44, 46. It may be appropriate in some instances to eliminate components of the local magnetic field which are not parallel to predetermined axis X by applying opposing fields through the use of additional coils positioned at right angles to coils 44 and 46. It may also be suitable to reduce the local magnetic field component to zero parallel to axis X using additional coils or the like concentric with or parallel to coils 44 and 46. Still further, it may be suitable to tune the field along each axis (X, Y, Z) to the same or different ions simultaneously, e.g. X for $Ca^{++}$, Y for $Mg^{++}$ and Z for $K^+$.

Figure 5:
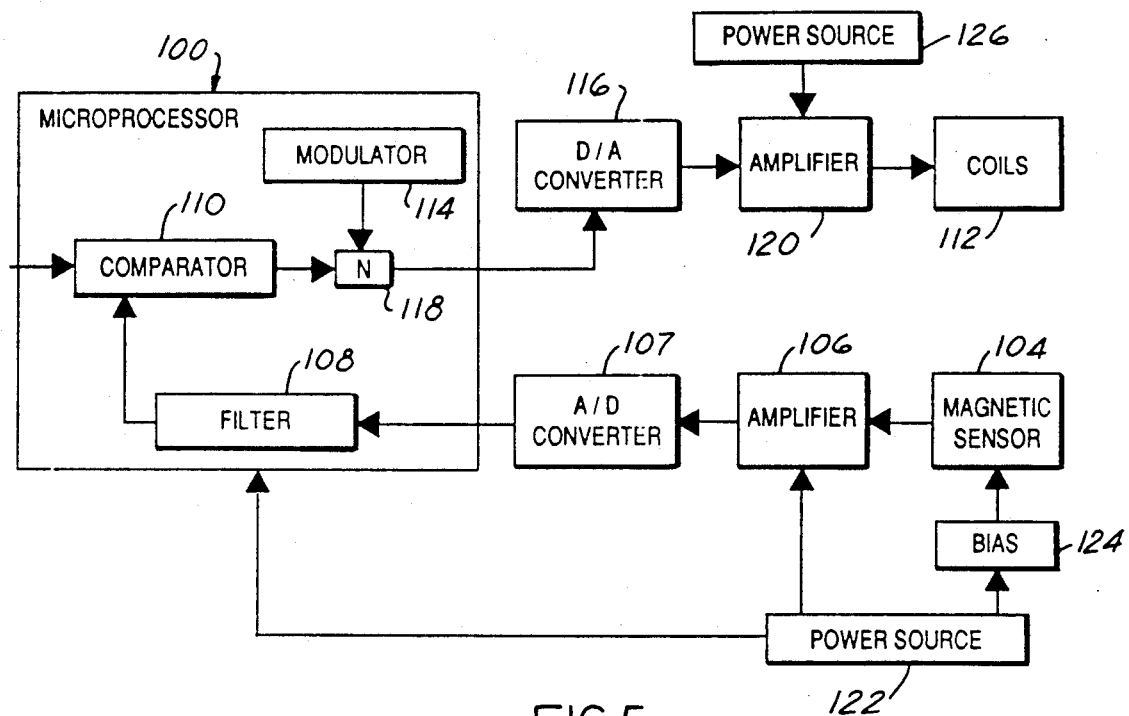
FIG. 5 is a block diagram illustrating the functional segments of a preferred circuit for use in the present invention.

The preferred relationships of magnetic flux density to frequency are preferably maintained using a microprocessor. Accordingly, and referring now to FIG. 5 of the drawings, a block diagram is shown which depicts one preferred arrangement of the circuits of plant growth apparatus 20 in functional segments. Numerous other circuit arrangements may be possible if the principles of the present invention are faithfully observed. Microcontroller or microprocessor 100 is seen by which the composite magnetic field is maintained at a constant predetermined level despite changes in the ambient component as previously described. In this respect, input 102 is provided by which a set point value of the predetermined composite magnetic flux density along a predetermined axis through the target plant material is input into microprocessor 100. As will be shown, the composite field strength is compared to this set point value to generate an error signal proportional to the difference in the set point value and the measured value of the composite magnetic flux density along the axis.

Magnetic field sensor 104 is provided by which the magnitude of the composite field which passes through the target plant material along the axis is measured. As stated, it is preferred that magnetic field sensor 104 comprise a Hall-effect device which, as will be known by those skilled in the art, produces an analog signal. The magnetic field sensor 104 constantly monitors the composite magnetic field, sending a signal to microprocessor 100. It will be understood that the output of a Hall-effect magnetic sensor is relatively small; thus, magnetic field sensor amplifier 106 is provided by which the signal from magnetic field sensor 104 is amplified, for example, up to three thousand times its original value. Since a Hall-effect device produces an analog signal, analog-to-digital converter 107 is provided by which the amplified signal from magnetic field sensor 104 is converted to a digital signal which can be used by microprocessor 100. It is preferred that the analog-to-digital converter be provided on-board the microprocessor chip.

As will be appreciated, the amplification of the magnetic field sensor signal may produce an unwanted noise level. Also, sudden changes in the magnetic field intensity may occur which make it difficult to determine the true average value of the composite magnetic flux density. Hence, the signal from analog-to-digital converter 106 which is input into microprocessor 100 is filtered by software filter 108 to remove shot noise and sudden fluctuations in the composite field detected by magnetic field sensor 104. Although it is preferred that filter 108 comprise software in microprocessor 100, a discrete filter could be used. In this embodiment, software filter 108 is a digital filter, preferably an integrator with a time constant of approximately 0.5 seconds. In other words, the changes in the magnitude of the composite magnetic field which are compensated for by increasing or decreasing the applied field are long-term changes of 0.5 seconds or more. Hence, the time constant of filter 108 should be such that momentary fluctuations are removed by the filter.

Microprocessor 100 includes logic which calculates the non-zero net average value of the composite magnetic flux density. This non-zero average value is then compared at a comparator 110 in microprocessor 100 to the predetermined dc reference or offset value which is input into microprocessor 100 via input 102. It should be noted that this reference value is preferably established by dedicated circuitry in microprocessor 100, although variable input means could be included by which the set point value could be changed. An error signal is then generated proportional to the difference between the measured value of the composite magnetic flux density and the set point or reference value. Microprocessor 100 then determines the magnitude of the output shift necessary to drive magnetic field generating coils 112 to bring the composite magnetic flux density back to the set point.

Software field modulator of oscillator 114 is provided by which an ac or fluctuating component is superimposed on the digital output signal which is input into digital-to-analog converter 116. From the previous discussion of the present invention, it will be understood that software field modulator 114 of microprocessor 100 in the preferred embodiment of the present invention is preset to a fixed, predetermined frequency to produce the desired predetermined, growth-regulating ratio of frequency-to-magnetic flux density value. In another embodiment, the feedback system of the present invention is such that changes in the composite magnetic flux density are measured, whereupon microprocessor 100 determines the necessary change in frequency to maintain the predetermined relationship. In that embodiment, software field analog converter 116 may be provided on-board the microprocessor chip. Hence, software field modulator 114 provides the ac component at node 118.

The signal from digital-to-analog converter 116 is fed to voltage-to-current amplifier 120, the output of which drives magnetic field generating coils 112 in the desired manner. Hence, the composite field is held substantially constant despite changes in the ambient component.

While several arrangements of power sources are suitable, it is preferred that power supply 122 be provided to power magnetic field sensor amplifier 106, microprocessor 100 and magnetic field sensor 104, the latter via bias circuitry 124. A separate power source 126 is preferred for voltage to current amplifier 120.

In one embodiment, the method includes controlling the average value of the applied magnetic flux density along a predetermined axis to maintain a predetermined ratio of frequency-to-composite magnetic flux density. In another embodiment, the frequency of the fluctuations is adjusted to maintain this relationship in which changes in the combined magnetic flux density due to changes in the local magnetic field are detected. Moreover, a combination of these two methods may be used wherein both the frequency and the magnitude of the magnetic field flux density are adjusted to maintain the predetermined relationship of the present invention.

As stated, the ratio of frequency-to-flux density is determined by selecting a preselected ion present in the plant material and tuning the fluctuating composite magnetic flux density to the specific cyclotron resonance frequency for the ion. The preferred ions for controlling plant growth are $Ca^{++}$, $K^+$ and $Mg^{++}$. Tuning to other ions may also provide beneficial results.

In another preferred embodiment of the present invention, coils 44 and 46 of plant growth apparatus 20 contain two discrete but otherwise equal windings. Each coil contains a dc winding and an ac winding. These windings are closely wound, either as alternate wires, as alternate layers, or in adjacent planes. Those skilled in the art will recognize that the closeness of the winding arrangement will ensure that the two separate magnetic fields generated at a point distant from the two windings (when each carries substantially the same current) will be substantially the same. The dc winding in one coil is connected in series, such that the magnetic fields from the two coils add, i.e. a field aiding connection. The ac winding in one coil is similarly connected in series, such that the magnetic fields from the two coils add, i.e. a field aiding connection.

The pair of dc windings are energized by a dc power supply that provides a current which reduces the component of the local or ambient field along the axis of the coil pair at the desired region to a value that is substantially zero. Again, the ambient field is measured by magnetic field sensing means such as a flux gate magnetometer or the like. The ac windings, in this embodiment, are preferably energized by a full-wave rectifier circuit providing a current which produces a resulting ac magnetic field component along the coil axis at the desired region that varies in time at the growth-controlling frequency. The peak current in the ac coil pair is adjusted until a preselected peak magnetic field component at plant 32 is achieved. It will be understood that once the ambient field is measured, knowledge of the coil geometry and number of turns will allow a predetermined calibration, enabling the operator to automatically achieve the required ambient field nulling current as well as the peak current necessary to create the preselected rms magnetic field.

In this embodiment, the frequency of the fluctuating magnetic field is set at a predetermined value, and the non-zero average value of the applied magnetic flux density is then regulated to control plant growth. Preferred ratios of frequency to non-zero average value are determined with reference to the equation:

$$\frac{f_0}{B_0} = q/2\pi m$$

where $f_0$ is the frequency of the fluctuating magnetic field in Hertz, $B_0$ is the non-zero average value of the magnetic field component along the coil axis in Tesla, (q/m) is in Coulombs per kilogram and has a value of from about $5\times10^5$ to about $100\times10^6$. $B_0$ preferably has a value not in excess of $1\times10^{-2}$ Tesla. The values of q and m are selected with reference to the change and mass of a preselected ion.

In still another embodiment, and referring now to FIG. 3 of the drawings, in addition to coils 44, 46, coils 60, 62 and coils 64, 66 generate applied magnetic fields such that magnetic fields are generated along the x, y and z axes of a Cartesian coordinate system. It will be appreciated that these coils may comprise single windings or may be provided in the combination ac and dc windings as previously described. Also, it is preferred that each pair be provided with a magnetic field sensing device in order to measure the magnetic field component along each respective axis, x, y and z. In other words, the axes of the three coil pairs will be mutually perpendicular, intersecting at the desired region in which the plant material is positioned. The desired magnetic field is generated by each coil pair in the aforementioned described manner. Where the coil pairs include ac and dc windings, the ambient field component along each axis is reduced to substantially zero.

In still another embodiment of the present invention, plant growth is controlled by creating and maintaining a predetermined relationship between the frequency of the fluctuations and the non-zero average value of the magnetic flux density along the predetermined axis based on the charge-to-mass ratio of the preselected ion, wherein this predetermined relationship is determined using the equation $f_{ch}=XB/2\pi m$. Accordingly, $f_{ch}$ is the frequency of the fluctuating magnetic flux density in Hertz, B is the non-zero average value of the flux density parallel to the predetermined axis in Tesla, q is the charge of the preselected ion in Coulombs, m is the mass of the preselected ion in kilograms, and X is a preselected odd integer greater than one. In this manner, a number of higher harmonic frequencies are provided by which control of plant growth may be achieved.

It will be recognized that the fundamental growth-controlling frequency $f_c$ is effectively multiplied by a selected odd integer to produce a frequency which also causes the desired result. Unless otherwise specified, as used herein, the term "odd integers" or "odd integer" shall mean positive, non-zero integers. The preferred odd integers for use in the present invention which provide harmonic frequencies that should be effective in controlling plant growth are selected form the group consisting of the following integers: three, five, seven, nine, eleven, thirteen, fifteen, seventeen and nineteen. Additional harmonic frequencies based on multiplying the fundamental frequency by an odd integer may also be suitable in some applications. As indicated, the frequencies for a given preselected ion and known magnetic flux density B can be determined with reference to the equation $f_{ch}=XB2\pi$ where $f_{ch}$ is the frequency is Hertz of the fluctuating magnetic field along a predetermined axis extending through the target tissue, B is the magnetic flux density along the axis in Tesla, q is the charge of the preselected ion in Coulombs, m is the mass of the preselected ion in kilograms, and X is a selected odd integer greater than one. It is believed that many of the preferred odd multiple harmonic frequencies will be substantially as effective in controlling plant growth as are the fundamental frequencies.

In another aspect, the present invention provides a method for controlling plant growth which comprises generating an applied magnetic field parallel to a predetermined axis which projects through the designated space. In the presence of at least two different predetermined ionic species in the plant material, the plant material is exposed to the applied magnetic field. In one embodiment, the plant material is also exposed to a local magnetic field having a component parallel to the predetermined axis. The magnetic flux density along the predetermined axis is fluctuated to create a non-zero average value. Where a local field is also present, this non-zero average value is the net non-zero average value of the applied and local field components parallel to the predetermined axis as previously described in connection with the other embodiments of the present invention.

A predetermined relationship between the frequency of the fluctuations and the non-zero average value of the magnetic flux density along the axis is then created and maintained which simultaneously controls the movement of two or more preselected ions. In one embodiment, the predetermined relationship is determined by first solving the equation $f_c=Bq/2\pi m$ at a generally randomly selected value of B for each distinct preselected ion, where $f_c$ is the frequency of the field fluctuations in Hertz, B is the non-zero average value of the flux density parallel to the predetermined axis in Tesla, q is the charge of each preselected ion in Coulombs, and m is the mass of each preselected ion in kilograms. The value of B is preferably less than about $1\times10^{-2}$ Tesla. This establishes the fundamental cyclotron frequency for each ion. A value $f_{cs}$ is preferably selected such that none of the individual ion $f_c$ values deviate more than 5 percent from the $f_{cs}$ value. In most instances, there will be no $f_{cs}$ value available based on the fundamental $f_c$ values of the preselected ions. Accordingly, a higher odd harmonic frequency of at least one of the preselected ions is determined with the equation $f_{ch}=XBq/2\pi m$ as previously explained. The values of $f_c$ and $f_{ch}$ are examined to determine whether an $f_{ch}$ value can be selected based on a 10 percent and most preferably a 5 percent deviation factor. If not, the process is continued for each value of $f_{ch}$, beginning with the lowest odd harmonic $f_{ch}$ values until a value of $f_{cs}$ can be established within the 5 percent deviation. Hence, at the value selected for B during the calculation of the $f_c$ or $f_{ch}$ values, the magnetic flux density to which the target plant material is exposed is fluctuated along the axis at the $f_{cs}$ frequency. This specific relationship between frequency and field strength controls plant growth of the target plant material.

In more detail, the fundamental frequency is calculated individually for each different ionic species to be regulated using the equation $f_c=Bq/2\pi m$ for a selected value of B, which is again the non-zero average value of the flux density along the predetermined axis. As previously explained, $f_c$ is in Hertz, q is in Coulombs, m is in kilograms, and q/m is the charge-to-mass ratio of the preselected ion. Once the fundamental cyclotron resonance frequency ($f_c$) of each ion to be regulated is calculated, a regulating frequency ($f_{cs}$) is determined which is preferably within 5 percent of the fundamental frequency $f_c$ or an odd harmonic frequency $f_{ch}$ of each preselected ion. The odd harmonic frequencies are determined again using the equation $f_{ch}=XBq/2\pi m$, where X is an odd integer greater than one. It will be understood that the equation $f_{ch}=XBq/2\pi m$ can be used to determine the fundamental frequency $f_c$ by using a value of 1 for X. While a value of $f_{cs}$ will not typically be available which is common in the fundamental frequencies and/or odd harmonic frequencies for each preselected ion, it has been found that an $f_{cs}$ value which is within about 10 percent and preferably about 5 percent of each $f_c$ value or $f_{ch}$ value of the ions is satisfactory.

It will also be understood that the values of $f_{ch}$ are a function of B. Thus, it may be possible to obtain an $f_{cs}$ value for a particular set of ions which is within the preferred 5 percent deviation at a designated B value, but not a higher B value. For use in the present invention, the value of B is preferably less than about $1 \times 10^{-2}$ Tesla, with a peak-to-peak amplitude from about $1.0\mu$ Tesla to about $1,000\mu$ Tesla. The preferred ions are those previously set forth.

The following example is provided to more fully illustrate the present invention and is not intended to limit the scope of the invention as defined in the appended claims.

EXAMPLE

For all of the experiments, plastic plant trays composed of individual 2.5 wide $\times$ 4 long $\times$ 6 cm deep wells were filled with gently compressed sterile expanded mineral medium (Perlite) saturated with sterile distilled water. Each well was filled to within 1 cm of the top. Seeds of the selected species (Romano bush beans) were then placed on the surface of the medium. The seeds were then covered by filling the wells to the top and scraping off any excess medium with a straight edge, burying the seeds to a depth of 1 cm.

The wells containing the seeds were then placed into trays containing 1.5 cm of a ¼ strength commercial complete liquid fertilizer solution (Ortho RaPid-Gro ™, Lot No. 109186, Ortho Div. of Chevron Chemical Co.) in distilled water. The trays were checked and refilled daily to maintain fluid level. The wells were illuminated by placing them under incandescent plant growth lights providing 14,000 lux at the surface of the medium for 14 Hr/day. Laboratory temperature was 23° plus or minus 2.0° C. Control wells received no further treatment.

Experimental wells were treated 24 Hr/day to Cyclotron resonance-tuned magnetic fields by placing the wells between energized Hemlholtz-aiding coils. The experiments ran for 18 days. The dates of emergence of the sprouts, final plant height (top of well to tip of terminal bud) and stem base thickness, final mass of above-soil plant portion (g) and final mass of roots (g) were recorded. The parametric values were compared with t-tests corrected for finite sample size. Non-parametric data were compared by Chi-square tests. The results are presented in FIGS. 6 and 7 of the drawings.

Figure 6:
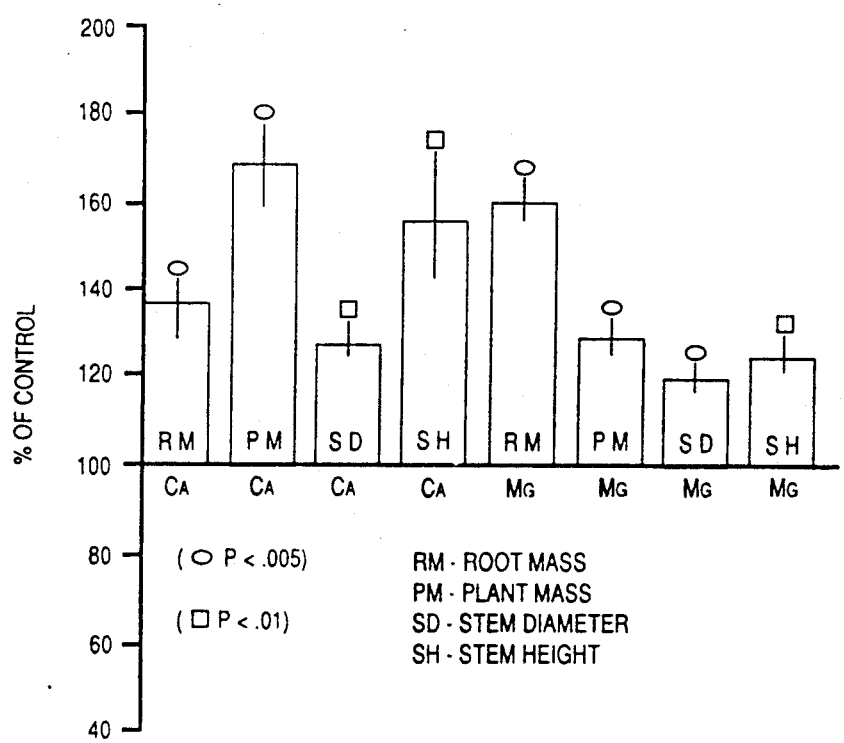
FIG. 6 is a graph illustrating the increases in root mass, plant mass, stem diameter and stem height of plants treated by the method of the present invention with either $Ca^{++}$ or $Mg^{++}$ cyclotron resonance control.

It is apparent from the results that sprouting, growth rate, and final plant mass were all affected by the treatment. In general, calcium and magnesium were clearly stimulatory to plant development. FIG. 6 shows that calcium was particularly effective in increasing plant (+67%) and root (+35%) mass. The height (+58%) and thickness (+25%) of the stems was also affected. Magnesium was less effective. However, in every case, the measured parameters were significantly different from the control values at the 99% level of confidence, and most were significant at the 99.5% level. In a few cases (16 plants each), the plants were carried to bud formation, and the calcium and magnesium treatments also speeded the production of flower buds significantly ($p < 0.05$).

Figure 7:
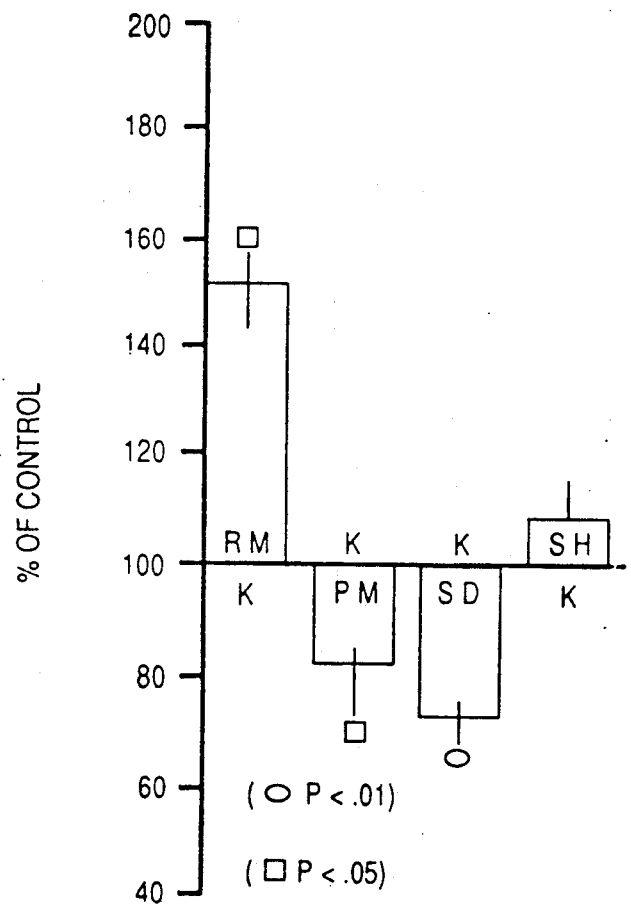
FIG. 7 is a graph illustrating the inhibition of plant mass and stem diameter by $K^+$ stimulation by the method of the present invention.

FIG. 7 shows that potassium had a clearly inhibitory effect on the stem diameter and above-ground mass of the seedlings. Both of these parameters were significantly decreased, as compared to controls. It had a stimulatory effect on root mass and a null effect on stem height. Potassium appears to have had either a null or slightly stimulatory effect on germination/sprouting, depending on the period. Early on (5 days), the effect was stimulatory. Later (7 days), it was null. In those few cases (16) where the plants were carried to bud formation, potassium inhibited flower bud formation as well as general growth.

Hence it can be seen from these results that the present invention has the potential to positively or negatively alter the growth and development of plants.

What is claimed is:

1. A method for controlling plant growth, comprising:
   generating an applied magnetic field parallel to a predetermined axis projecting through a space in which viable plant material is positioned, said applied magnetic field resulting in a magnetic flux density in said space of a known average value parallel to said predetermined axis;
   fluctuating said magnetic flux density such that said known average value is a non-zero average value;
   creating a predetermined relationship between the frequency of said fluctuations and said non-zero average value of said magnetic flux density, wherein said predetermined relationship is determined using the equation $f_{ch} = XBq/2\pi m$, where $f_{ch}$ is the frequency of the fluctuating magnetic flux density in Hertz, B is the non-zero average value of the flux density parallel to said predetermined axis in Tesla, q is the charge of a preselected ion present in said plant material in Coulombs, m is the mass of said preselected ion in kilograms, and X is a selected odd integer greater than 1, such that said predetermined relationship is effective in altering the natural growth rate of said plant material.

2. The method recited in claim 1, wherein said space is subject to a local magnetic field having a component parallel to said predetermined axis and wherein said non-zero average value of said magnetic flux density is a net average value which includes the magnetic flux density of said component of said local magnetic field.

3. The method recited in claim 1, wherein said selected odd integer is selected from the group consisting of odd integers from 1 to 19.

4. The method recited in claim 1, wherein said means for creating said predetermined relationship includes a magnetic field sensor and a microprocessor.

5. The method recited in claim 1, wherein said preselected ion is selected from the group consisting of $Ca^{++}$, $K^+$ and $Mg^{++}$.

6. A method for controlling plant growth comprising the steps of:
   positioning a magnetic field generating means adjacent viable plant material such that said plant material occupies a predetermined space;
   generating a magnetic flux with said magnetic field generating means, said magnetic flux extending through said plant material parallel to a predetermined axis projecting through said predetermined space;

fluctuating said magnetic flux and controlling the density of said magnetic flux to create and maintain a predetermined relationship between the frequency of said fluctuations and the magnitude of said magnetic flux density which is effective in altering the natural growth rate of said plant material; and wherein said predetermined relationship of said frequency to said magnitude of said magnetic flux density is determined as a function of $$f_c/B = q/(2\pi m)$$

where $f_c$ is said frequency in Hertz, B is the average value of said magnetic flux density in Tesla parallel to said predetermined axis, q is the charge of a preselected ion present in said plant material in Coulombs and m is the mass of said preselected ion in kilograms, and q/m has a value of from about $5 \times 10^5$ to about $100 \times 10^6$ Coulombs per kilogram.

7. The method recited in claim 6, wherein said magnetic flux is combined with an ambient magnetic flux present in said region of said plant material to create a composite magnetic flux density.

8. The method recited in claim 6, wherein q and m are, respectively, equal to the charge and mass of a preselected ionic species.

9. The method recited in claim 8, wherein said preselected ionic species is selected from the group consisting of $Ca^{++}$, $K^+$ and $Mg^{++}$.

10. The method recited in claim 6, wherein B has a value not in excess of about $1 \times 10^{-2}$ Tesla.

11. A method for controlling plant growth, comprising the steps of:
generating a fluctuating applied magnetic field parallel to a predetermined axis projecting through a space in which viable plant material is positioned, said applied magnetic field resulting in a magnetic flux density in said space of a known non-zero average value parallel to said predetermined axis;
fluctuating said magnetic flux density such that said known average value is a non-zero average value;
selecting at least two ions present in said plant material;
determining a value $f_{ch}$ for each of said selected ions where $f_{ch} = XBq/2\pi m$, where B is said non-zero average value of said magnetic flux density along said axis, q is the charge of each of said ions in Coulombs, m is the mass of each of said ions in kilograms and X is a selected positive non-zero odd integer, said $f_{ch}$ value being a value which is effective in altering the natural growth rate of said plant material;
selecting a value $f_{cs}$ in Hertz from which each value $f_{ch}$ deviates less than a predetermined percentage;
fluctuating said magnetic field parallel to said axis at a rate which is equal to said $f_{cs}$ value; and
maintaining the ratio of said $f_{cs}$ rate of fluctuation to said non-zero average value of said magnetic flux density parallel to said axis,
whereby said ratio is effective in altering the natural growth rate of said plant material.

12. The method recited in claim 11, wherein said predetermined percentage is less than 5 percent.

13. The invention recited in claim 11, wherein said at least two different selected ions comprises three ions.

14. The method recited in claim 11, wherein said selected odd integer is selected from the group consisting of 1, 3, 5, 7, 9, 11, 13, 15, 17 and 19.

15. The method recited in claim 11, wherein said apparatus includes a magnetic field sensor and a microprocessor.

16. The method recited in claim 11, wherein said selected ions are selected from the group consisting of $Ca^{++}$, $K^+$ and $Mg^{++}$.

17. A method for controlling plant growth, comprising:
generating an applied magnetic flux parallel to a predetermined axis and projecting through a predetermined space, said space being occupied by viable plant material adjacent a magnetic flux generating means;
said flux generating means having at least two field coils, said field coils having an axis extending therethrough parallel to said predetermined axis, each of said field coils further having at least two windings, one of said windings of each coil being an ac winding and the other of said windings being a dc winding, said ac winding having an associated full-wave rectifier and an oscillator;
measuring an ambient field existing in said predetermined space along said predetermined axis in the region of said plant material;
said applied magnetic flux generating step including the steps of generating with said dc winding a magnetic flux which reduces said ambient field to substantially zero and generating with said ac windings an ac magnetic field having a component along said predetermined axis in said predetermined space, said ac magnetic field component having a preselected root mean square value which alters the natural growth rate of said plant material; and
said preselected root mean square value being a function of $$\frac{f_o}{B_o} = q/2\pi m$$

where $f_o$ is the frequency of said ac magnetic field component along said axis in Hertz, $B_o$ is the average value of said magnetic field component in Tesla, q is the charge of a preselected ion present in said plant material in Coulombs and m is the mass of said preselected ion in kilograms, and q/m has a value of from about $5 \times 10^5$ to about $100 \times 10^6$, Coulombs per kilogram.

18. An apparatus for controlling plant growth, comprising:
means for generating an applied magnetic flux parallel to a predetermined axis and projecting through a predetermined space containing viable plant material;
means for measuring magnetic flux density parallel to said predetermined axis in said predetermined space, said magnetic flux density measuring means being adapted to measure a magnetic flux density having a non-zero average value;
means associated with said flux generating means for fluctuating said applied magnetic flux;
means for creating and maintaining a relationship between the rate of fluctuation of said magnetic flux and the intensity of said magnetic flux density, where said predetermined relationship is effective in altering the natural growth rate of said plant tissue; and said predetermined relationship being a function of $$f_c/B = q/(2\pi m)$$

where $f_c$ is frequency in Hertz, B is the average value of said magnetic flux density in Tesla parallel to said predetermined axis q is the charge of a preselected ion present in said plant material in Coulombs and m is the mass of said preselected ion in kilograms, and q/m has a value of from about $5 \times 10^5$ to about $100 \times 10^6$ Coulombs per kilogram.

19. The apparatus recited in claim 18, wherein said means for generating an applied magnetic flux includes at least one field coil.

20. The apparatus recited in claim 18, wherein said means for generating an applied magnetic flux includes two field coils arranged in a Helmholtz configuration.

21. The apparatus recited in claim 18, wherein said means for measuring the magnetic flux density parallel to said predetermined axis in said predetermined volume includes a magnetometer.

22. The apparatus recited in claim 18, wherein said means for creating and maintaining said relationship includes microprocessing means.

23. The apparatus recited in claim 18, further including a first housing of a non-magnetic material enclosing one of said field coils and a second housing of non-magnetic material enclosing the other of said field coils.

* * * * *